(12) United States Patent
Kawashima et al.

(10) Patent No.: US 11,920,001 B2
(45) Date of Patent: Mar. 5, 2024

(54) PHOTOCURABLE COMPOSITION

(71) Applicant: Panasonic Intellectual Property Management Co., Ltd., Osaka (JP)

(72) Inventors: Keisuke Kawashima, Osaka (JP); Honami Nawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 17/660,647

(22) Filed: Apr. 26, 2022

(65) Prior Publication Data

US 2022/0363832 A1    Nov. 17, 2022

(30) Foreign Application Priority Data

May 14, 2021 (JP) ................. 2021-082583

(51) Int. Cl.
| | | |
|---|---|---|
| *C08F 2/46* | (2006.01) | |
| *C08F 2/50* | (2006.01) | |
| *C08G 61/04* | (2006.01) | |
| *C08G 75/045* | (2016.01) | |

(52) U.S. Cl.
CPC ................ *C08G 75/045* (2013.01)

(58) Field of Classification Search
CPC . C08G 75/045; C08F 2/46; C08F 2/50; C08F 2/48
USPC ........... 522/65, 63, 6, 71, 1, 189, 184; 520/1
See application file for complete search history.

(56) References Cited

U.S. PATENT DOCUMENTS

| | | |
|---|---|---|
| 2014/0329926 A1 | 11/2014 | Kirino |
| 2020/0347227 A1 | 11/2020 | Abe et al. |

FOREIGN PATENT DOCUMENTS

| | | | | |
|---|---|---|---|---|
| JP | 2014-077148 | | 5/2014 | |
| JP | 6036703 B | | 11/2016 | |
| JP | 2020-139136 | | 9/2020 | |
| WO | WO-2009010423 A1 | * | 1/2009 | ....... B32B 17/10036 |
| WO | 2013/089100 | | 6/2013 | |
| WO | 2019/151256 | | 8/2019 | |

* cited by examiner

*Primary Examiner* — Jessica Whiteley
(74) *Attorney, Agent, or Firm* — Wenderoth, Lind & Ponack, L.L.P.

(57) ABSTRACT

A photocurable composition contains:
a component (A): (meth)acrylic acid ester having 2 to 6 (meth)acryloyl groups in one molecule,
a component (B): a thiol compound having 2 to 4 thiol groups in one molecule, and
a component (C): a photobase generator,
in which a mass ratio of the component (A) to the component (B) is 66:34 to 33:67, inclusive,
a functional group equivalent of the component (A) is 96 g/eq to 180 g/eq, inclusive,
a functional group equivalent of the component (B) is 95 g/eq to 190 g/eq, inclusive, and
a content of the component (C) is 0.5 parts by mass to 2 parts by mass with respect to 100 parts by mass of a total of the component (A), the component (B), and the component (C).

5 Claims, 5 Drawing Sheets

FIG. 1

| COMPONENT | | NUMBER OF FUNCTIONAL GROUPS | FUNCTIONAL GROUP EQUIVALENT (g/eq) | PRODUCT NAME | EXAMPLE | | | | | | | | | |
|---|---|---|---|---|---|---|---|---|---|---|---|---|---|---|
| | | | | | 1 | 2 | 3 | 4 | 5 | 6 | 7 | 8 | 9 | 10 |
| (A) COMPONENT | (A-1) | 6 | 96 | DPE-6A | 8.2 | 9.3 | 6.7 | 7.0 | 9.9 | 0.0 | 0.0 | 0.0 | 0.0 | 0.0 |
| | (A-2) | 3 | 151 | M-313 | 0.0 | 0.0 | 0.0 | 0.0 | 0.0 | 10.4 | 11.5 | 8.8 | 9.1 | 12.1 |
| | (A-3) | 3 | 99 | M-309 | 0.0 | 0.0 | 0.0 | 0.0 | 0.0 | 0.0 | 0.0 | 0.0 | 0.0 | 0.0 |
| | (A-4) | 3 | 141 | FA-731A | 0.0 | 0.0 | 0.0 | 0.0 | 0.0 | 0.0 | 0.0 | 0.0 | 0.0 | 0.0 |
| | (A-5) | 2 | 166 | DCP | 0.0 | 0.0 | 0.0 | 0.0 | 0.0 | 0.0 | 0.0 | 0.0 | 0.0 | 0.0 |
| | (A-6) | 6 | 179 | MAC-SQ TM-100 | 11.6 | 0.0 | 0.0 | 0.0 | 0.0 | 9.4 | 0.0 | 0.0 | 0.0 | 0.0 |
| (B) COMPONENT | (B-1) | 4 | 136 | PE-1 | 0.0 | 0.0 | 0.0 | 0.0 | 0.0 | 0.0 | 0.0 | 0.0 | 0.0 | 0.0 |
| | (B-2) | 4 | 110 | C3TS-G | 0.0 | 10.5 | 0.0 | 0.0 | 0.0 | 0.0 | 8.3 | 0.0 | 0.0 | 0.0 |
| | (B-3) | 3 | 189 | NR-1 | 0.0 | 0.0 | 13.1 | 12.8 | 0.0 | 0.0 | 0.0 | 11.0 | 0.0 | 0.0 |
| | (B-4) | 3 | 177 | SS32 | 0.0 | 0.0 | 0.0 | 0.0 | 0.0 | 0.0 | 0.0 | 0.0 | 10.7 | 0.0 |
| | (B-5) | 4 | 96 | TS-G | 0.0 | 0.0 | 0.0 | 0.0 | 9.9 | 0.0 | 0.0 | 0.0 | 0.0 | 7.7 |
| (C) COMPONENT | (C-1) | - | - | NPPOC-TMG | 0.2 | 0.2 | 0.2 | 0.2 | 0.2 | 0.2 | 0.2 | 0.2 | 0.2 | 0.2 |
| TOTAL MASS (PARTS) OF COMPONENT (A), COMPONENT (B), AND COMPONENT (C) | | | | | 20.0 | 20.0 | 20.0 | 20.0 | 20.0 | 20.0 | 20.0 | 20.0 | 20.0 | 20.0 |
| MASS (PARTS) OF EACH COMPONENT WITH RESPECT TO 100 PARTS OF TOTAL MASS OF COMPONENT (A), COMPONENT (B), AND COMPONENT (C) | | | | (A) COMPONENT | 41.0 | 46.3 | 33.4 | 34.9 | 49.7 | 52.0 | 57.3 | 43.9 | 45.5 | 60.6 |
| | | | | (B) COMPONENT | 58.0 | 52.7 | 65.6 | 64.1 | 49.3 | 47.0 | 41.7 | 55.1 | 53.5 | 38.4 |
| | | | | (C) COMPONENT | 1.0 | 1.0 | 1.0 | 1.0 | 1.0 | 1.0 | 1.0 | 1.0 | 1.0 | 1.0 |
| MASS RATIO OF COMPONENT (A) TO COMPONENT (B) (PERCENTAGE: %) | | | | (A) COMPONENT | 41.5 | 46.8 | 33.8 | 35.2 | 50.2 | 52.5 | 57.9 | 44.3 | 46.0 | 61.2 |
| | | | | (B) COMPONENT | 58.5 | 53.2 | 66.2 | 64.8 | 49.8 | 47.5 | 42.1 | 55.7 | 54.0 | 38.8 |
| EVALUATION OF CURABILITY OF PHOTOCURABLE COMPOSITION | | | | UNDER NON-UV IRRADIATION | Y | Y | Y | Y | Y | Y | Y | Y | Y | Y |
| | | | | UNDER UV IRRADIATION | Y | Y | Y | Y | Y | Y | Y | Y | Y | Y |
| | | | | COMPREHENSIVE DETERMINATION | Y | Y | Y | Y | Y | Y | Y | Y | Y | Y |

FIG. 2

| COMPONENT | | NUMBER OF FUNCTIONAL GROUPS | FUNCTIONAL GROUP EQUIVALENT (g/eq) | PRODUCT NAME | EXAMPLE | | | | | | | | | |
|---|---|---|---|---|---|---|---|---|---|---|---|---|---|---|
| | | | | | 11 | 12 | 13 | 14 | 15 | 16 | 17 | 18 | 19 | 20 |
| (A) COMPONENT | (A-1) | 6 | 96 | DPE-6A | 0.0 | 0.0 | 0.0 | 0.0 | 0.0 | 0.0 | 0.0 | 0.0 | 0.0 | 0.0 |
| | (A-2) | 3 | 151 | M-313 | 0.0 | 0.0 | 0.0 | 0.0 | 0.0 | 0.0 | 0.0 | 0.0 | 0.0 | 0.0 |
| | (A-3) | 3 | 99 | M-309 | 8.3 | 9.4 | 6.8 | 7.1 | 10.1 | 0.0 | 11.1 | 8.5 | 8.8 | 11.8 |
| | (A-4) | 3 | 141 | FA-731A | 0.0 | 0.0 | 0.0 | 0.0 | 0.0 | 10.1 | 0.0 | 0.0 | 0.0 | 0.0 |
| | (A-5) | 2 | 166 | DCP | 0.0 | 0.0 | 0.0 | 0.0 | 0.0 | 0.0 | 0.0 | 0.0 | 0.0 | 0.0 |
| | (A-6) | 6 | 179 | MAC-SQ TM-100 | 0.0 | 0.0 | 0.0 | 0.0 | 0.0 | 0.0 | 0.0 | 0.0 | 0.0 | 0.0 |
| (B) COMPONENT | (B-1) | 4 | 136 | PE-1 | 11.5 | 0.0 | 0.0 | 0.0 | 0.0 | 9.7 | 0.0 | 0.0 | 0.0 | 0.0 |
| | (B-2) | 4 | 110 | C3TS-G | 0.0 | 10.4 | 0.0 | 0.0 | 0.0 | 0.0 | 8.7 | 0.0 | 0.0 | 0.0 |
| | (B-3) | 3 | 189 | NR-1 | 0.0 | 0.0 | 13.0 | 0.0 | 0.0 | 0.0 | 0.0 | 11.3 | 0.0 | 0.0 |
| | (B-4) | 3 | 177 | SS32 | 0.0 | 0.0 | 0.0 | 12.7 | 0.0 | 0.0 | 0.0 | 0.0 | 11.0 | 0.0 |
| | (B-5) | 4 | 96 | TS-G | 0.0 | 0.0 | 0.0 | 0.0 | 9.7 | 0.0 | 0.0 | 0.0 | 0.0 | 8.0 |
| (C) COMPONENT | (C-1) | - | - | NPPOC-TMG | 0.2 | 0.2 | 0.2 | 0.2 | 0.2 | 0.2 | 0.2 | 0.2 | 0.2 | 0.2 |
| TOTAL MASS (PARTS) OF COMPONENT (A), COMPONENT (B), AND COMPONENT (C) | | | | | 20.0 | 20.0 | 20.0 | 20.0 | 20.0 | 20.0 | 20.0 | 20.0 | 20.0 | 20.0 |
| MASS (PARTS) OF EACH COMPONENT WITH RESPECT TO 100 PARTS OF TOTAL MASS OF COMPONENT (A), COMPONENT (B), AND COMPONENT (C) | | | | (A) COMPONENT | 41.6 | 46.9 | 34.0 | 35.4 | 50.3 | 50.4 | 55.7 | 42.3 | 43.9 | 59.0 |
| | | | | (B) COMPONENT | 57.4 | 52.1 | 65.0 | 63.6 | 48.7 | 48.6 | 43.3 | 56.7 | 55.1 | 40.0 |
| | | | | (C) COMPONENT | 1.0 | 1.0 | 1.0 | 1.0 | 1.0 | 1.0 | 1.0 | 1.0 | 1.0 | 1.0 |
| MASS RATIO OF COMPONENT (A) TO COMPONENT (B) (PERCENTAGE: %) | | | | (A) COMPONENT | 42.0 | 47.4 | 34.3 | 35.8 | 50.8 | 50.9 | 56.3 | 42.7 | 44.3 | 59.6 |
| | | | | (B) COMPONENT | 58.5 | 52.6 | 65.7 | 64.2 | 49.2 | 49.1 | 43.7 | 57.3 | 55.7 | 40.4 |
| EVALUATION OF CURABILITY OF PHOTOCURABLE COMPOSITION | | | | UNDER NON-UV IRRADIATION | Y | Y | Y | Y | Y | Y | Y | Y | Y | Y |
| | | | | UNDER UV IRRADIATION | Y | Y | Y | Y | Y | Y | Y | Y | Y | Y |
| | | | | COMPREHENSIVE DETERMINATION | Y | Y | Y | Y | Y | Y | Y | Y | Y | Y |

FIG. 3

| COMPONENT | | NUMBER OF FUNCTIONAL GROUPS | FUNCTIONAL GROUP EQUIVALENT (g/eq) | PRODUCT NAME | EXAMPLE | | | | | | | | | | | |
|---|---|---|---|---|---|---|---|---|---|---|---|---|---|---|---|---|
| | | | | | 21 | 22 | 23 | 24 | 25 | 26 | 27 | 28 | 29 | 30 | 31 | 32 |
| (A) COMPONENT | (A-1) | 6 | 96 | DPE-6A | 0.0 | 0.0 | 0.0 | 0.0 | 0.0 | 0.0 | 0.0 | 0.0 | 0.0 | 0.0 | 8.2 | 8.1 |
| | (A-2) | 3 | 151 | M-313 | 0.0 | 0.0 | 0.0 | 0.0 | 0.0 | 0.0 | 0.0 | 0.0 | 0.0 | 0.0 | 0.0 | 0.0 |
| | (A-3) | 3 | 99 | M-309 | 0.0 | 0.0 | 0.0 | 0.0 | 0.0 | 0.0 | 0.0 | 0.0 | 0.0 | 0.0 | 0.0 | 0.0 |
| | (A-4) | 3 | 141 | FA-731A | 0.0 | 0.0 | 0.0 | 0.0 | 0.0 | 0.0 | 0.0 | 0.0 | 0.0 | 0.0 | 0.0 | 0.0 |
| | (A-5) | 2 | 166 | DCP | 0.0 | 0.0 | 0.0 | 0.0 | 0.0 | 0.0 | 0.0 | 0.0 | 0.0 | 0.0 | 0.0 | 0.0 |
| | (A-6) | 6 | 179 | MAC-SQ TM-100 | 10.9 | 11.9 | 9.3 | 9.6 | 12.6 | 11.2 | 12.3 | 9.6 | 9.9 | 12.9 | 11.7 | 11.5 |
| (B) COMPONENT | (B-1) | 4 | 136 | PE-1 | 8.9 | 0.0 | 0.0 | 0.0 | 0.0 | 8.6 | 0.0 | 0.0 | 0.0 | 0.0 | 0.0 | 0.0 |
| | (B-2) | 4 | 110 | C3TS-G | 0.0 | 7.9 | 0.0 | 0.0 | 0.0 | 0.0 | 7.5 | 0.0 | 0.0 | 0.0 | 0.0 | 0.0 |
| | (B-3) | 3 | 189 | NR-1 | 0.0 | 0.0 | 10.5 | 0.0 | 0.0 | 0.0 | 0.0 | 0.0 | 0.0 | 0.0 | 0.0 | 0.0 |
| | (B-4) | 3 | 177 | SS32 | 0.0 | 0.0 | 0.0 | 10.2 | 0.0 | 0.0 | 0.0 | 10.2 | 9.9 | 6.9 | 0.0 | 0.0 |
| | (B-5) | 4 | 96 | TS-G | 0.0 | 0.0 | 0.0 | 0.0 | 7.2 | 0.0 | 0.0 | 0.0 | 0.0 | 0.0 | 0.0 | 0.0 |
| (C) COMPONENT | (C-1) | - | - | NPPOC-TMG | 0.2 | 0.2 | 0.2 | 0.2 | 0.2 | 0.2 | 0.2 | 0.2 | 0.2 | 0.2 | 0.1 | 0.4 |
| TOTAL MASS (PARTS) OF COMPONENT (A), COMPONENT (B), AND COMPONENT (C) | | | | | 20.0 | 20.0 | 20.0 | 20.0 | 20.0 | 20.0 | 20.0 | 20.0 | 20.0 | 20.0 | 20.0 | 20.0 |
| MASS (PARTS) OF EACH COMPONENT WITH RESPECT TO 100 PARTS OF TOTAL MASS OF COMPONENT (A), COMPONENT (B), AND COMPONENT (C) | | | | (A) COMPONENT | 54.4 | 59.6 | 46.3 | 47.9 | 62.8 | 56.2 | 61.4 | 48.1 | 49.7 | 64.5 | 41.2 | 40.6 |
| | | | | (B) COMPONENT | 44.6 | 39.4 | 52.7 | 51.1 | 36.2 | 42.8 | 37.6 | 50.9 | 49.3 | 34.5 | 58.3 | 57.4 |
| | | | | (C) COMPONENT | 1.0 | 1.0 | 1.0 | 1.0 | 1.0 | 1.0 | 1.0 | 1.0 | 1.0 | 1.0 | 0.5 | 2.0 |
| MASS RATIO OF COMPONENT (A) TO COMPONENT (B) (PERCENTAGE: %) | | | | (A) COMPONENT | 55.0 | 60.2 | 46.8 | 48.4 | 63.5 | 56.8 | 62.0 | 48.6 | 50.2 | 65.2 | 41.5 | 41.5 |
| | | | | (B) COMPONENT | 45.0 | 39.8 | 53.2 | 51.6 | 36.5 | 43.2 | 38.0 | 51.4 | 49.8 | 34.8 | 58.5 | 58.5 |
| EVALUATION OF CURABILITY OF PHOTOCURABLE COMPOSITION | | | | UNDER NON-UV IRRADIATION | Y | Y | Y | Y | Y | Y | Y | Y | Y | Y | Y | Y |
| | | | | UNDER UV IRRADIATION | Y | Y | Y | Y | Y | Y | Y | Y | Y | Y | Y | Y |
| | | | | COMPREHENSIVE DETERMINATION | Y | Y | Y | Y | Y | Y | Y | Y | Y | Y | Y | Y |

FIG. 4

| COMPONENT | | NUMBER OF FUNCTIONAL GROUPS | FUNCTIONAL GROUP EQUIVALENT (g/eq) | PRODUCT NAME | COMPARATIVE EXAMPLE | | | | | | | | | |
|---|---|---|---|---|---|---|---|---|---|---|---|---|---|---|
| | | | | | 1 | 2 | 3 | 4 | 5 | 6 | 7 | 8 | 9 | 10 |
| (A) COMPONENT | (A-1) | 6 | 96 | DPE-6A | 0.0 | 0.0 | 0.0 | 0.0 | 0.0 | 6.3 | 0.0 | 0.0 | 0.0 | 0.0 |
| | (A-2) | 3 | 151 | M-313 | 0.0 | 0.0 | 0.0 | 0.0 | 0.0 | 0.0 | 8.4 | 0.0 | 0.0 | 0.0 |
| | (A-3) | 3 | 99 | M-309 | 0.0 | 0.0 | 0.0 | 0.0 | 0.0 | 0.0 | 0.0 | 6.4 | 0.0 | 0.0 |
| | (A-4) | 3 | 141 | FA-731A | 0.0 | 0.0 | 0.0 | 0.0 | 0.0 | 0.0 | 0.0 | 0.0 | 8.1 | 0.0 |
| | (A-5) | 2 | 166 | DCP | 0.0 | 0.0 | 0.0 | 0.0 | 0.0 | 0.0 | 0.0 | 0.0 | 0.0 | 8.8 |
| | (A-6) | 6 | 179 | MAC-SQ TM-100 | 0.0 | 0.0 | 0.0 | 0.0 | 0.0 | 0.0 | 0.0 | 0.0 | 0.0 | 0.0 |
| | (A-7) | 1 | 254 | LMA | 12.8 | 13.7 | 11.2 | 11.6 | 14.2 | 0.0 | 0.0 | 0.0 | 0.0 | 0.0 |
| | (A-8) | 2 | 425 | EBECRYL 3701 | 0.0 | 0.0 | 0.0 | 0.0 | 0.0 | 0.0 | 0.0 | 0.0 | 0.0 | 0.0 |
| (B) COMPONENT | (B-1) | 4 | 136 | PE-1 | 6.8 | 0.0 | 0.0 | 0.0 | 0.0 | 0.0 | 0.0 | 0.0 | 0.0 | 0.0 |
| | (B-2) | 4 | 110 | C3TS-G | 0.0 | 5.9 | 0.0 | 0.0 | 0.0 | 0.0 | 0.0 | 0.0 | 0.0 | 0.0 |
| | (B-3) | 3 | 189 | NR-1 | 0.0 | 0.0 | 8.4 | 0.0 | 0.0 | 0.0 | 0.0 | 0.0 | 0.0 | 0.0 |
| | (B-4) | 3 | 177 | SS32 | 0.0 | 0.0 | 0.0 | 8.0 | 0.0 | 0.0 | 0.0 | 0.0 | 0.0 | 0.0 |
| | (B-5) | 4 | 96 | TS-G | 0.0 | 0.0 | 0.0 | 0.0 | 5.4 | 0.0 | 0.0 | 0.0 | 0.0 | 0.0 |
| | (B-6) | 1 | 202 | - | 0.0 | 0.0 | 0.0 | 0.0 | 0.0 | 13.3 | 11.2 | 13.2 | 11.5 | 10.8 |
| (C) COMPONENT | (C-1) | - | - | NPPOC-TMG | 0.2 | 0.2 | 0.2 | 0.2 | 0.2 | 0.2 | 0.2 | 0.2 | 0.2 | 0.2 |
| TOTAL MASS (PARTS) OF COMPONENT (A), COMPONENT (B), AND COMPONENT (C) | | | | | 19.8 | 19.8 | 19.8 | 19.8 | 19.8 | 19.8 | 19.8 | 19.8 | 19.8 | 19.8 |
| MASS (PARTS) OF EACH COMPONENT WITH RESPECT TO 100 PARTS OF TOTAL MASS OF COMPONENT (A), COMPONENT (B), AND COMPONENT (C) | | | | (A) COMPONENT | 64.5 | 69.2 | 56.8 | 58.3 | 71.9 | 32.0 | 42.3 | 32.5 | 40.7 | 44.7 |
| | | | | (B) COMPONENT | 34.5 | 29.8 | 42.2 | 40.7 | 27.0 | 67.0 | 56.7 | 66.5 | 58.3 | 54.3 |
| | | | | (C) COMPONENT | 1.0 | 1.0 | 1.0 | 1.0 | 1.0 | 1.0 | 1.0 | 1.0 | 1.0 | 1.0 |
| MASS RATIO OF COMPONENT (A) TO COMPONENT (B) (PERCENTAGE: %) | | | | (A) COMPONENT | 65.1 | 69.9 | 57.3 | 58.9 | 72.7 | 32.3 | 42.7 | 32.8 | 41.1 | 45.1 |
| | | | | (B) COMPONENT | 34.9 | 30.1 | 42.7 | 41.1 | 27.3 | 67.7 | 57.3 | 67.2 | 58.9 | 54.9 |
| EVALUATION OF CURABILITY OF PHOTOCURABLE COMPOSITION | | | | UNDER NON-UV IRRADIATION | Y | Y | Y | Y | Y | Y | Y | Y | Y | Y |
| | | | | UNDER UV IRRADIATION | N | N | N | N | N | N | N | N | N | N |
| | | | | COMPREHENSIVE DETERMINATION | N | N | N | N | N | N | N | N | N | N |

FIG. 5

| COMPONENT | | NUMBER OF FUNCTIONAL GROUPS | FUNCTIONAL GROUP EQUIVALENT (g/eq) | PRODUCT NAME | COMPARATIVE EXAMPLE | | | | | | | | | |
|---|---|---|---|---|---|---|---|---|---|---|---|---|---|---|
| | | | | | 11 | 12 | 13 | 14 | 15 | 16 | 17 | 18 | 19 |
| (A) COMPONENT | (A-1) | 6 | 96 | DPE-6A | 0.0 | 0.0 | 0.0 | 0.0 | 0.0 | 16.6 | 3.0 | 8.3 | 8.0 |
| | (A-2) | 3 | 151 | M-313 | 0.0 | 0.0 | 0.0 | 0.0 | 0.0 | 0.0 | 0.0 | 0.0 | 0.0 |
| | (A-3) | 3 | 99 | M-309 | 0.0 | 0.0 | 0.0 | 0.0 | 0.0 | 0.0 | 0.0 | 0.0 | 0.0 |
| | (A-4) | 3 | 141 | FA-731A | 0.0 | 0.0 | 0.0 | 0.0 | 0.0 | 0.0 | 0.0 | 0.0 | 0.0 |
| | (A-5) | 2 | 166 | DCP | 0.0 | 0.0 | 0.0 | 0.0 | 0.0 | 0.0 | 0.0 | 0.0 | 0.0 |
| | (A-6) | 6 | 179 | MAC-SQ TM-100 | 0.0 | 0.0 | 0.0 | 0.0 | 0.0 | 0.0 | 0.0 | 0.0 | 0.0 |
| | (A-7) | 1 | 254 | LMA | 0.0 | 0.0 | 0.0 | 0.0 | 0.0 | 0.0 | 0.0 | 0.0 | 0.0 |
| | (A-8) | 2 | 425 | EBECRYL 3701 | 15.0 | 15.7 | 13.7 | 14.0 | 13.4 | 0.0 | 0.0 | 11.7 | 11.2 |
| (B) COMPONENT | (B-1) | 4 | 136 | PE-1 | 4.8 | 0.0 | 0.0 | 0.0 | 0.0 | 3.0 | 0.0 | 0.0 | 0.0 |
| | (B-2) | 4 | 110 | C3TS-G | 0.0 | 4.1 | 0.0 | 0.0 | 0.0 | 0.0 | 16.6 | 0.0 | 0.0 |
| | (B-3) | 3 | 189 | NR-1 | 0.0 | 0.0 | 6.1 | 0.0 | 0.0 | 0.0 | 0.0 | 0.0 | 0.0 |
| | (B-4) | 3 | 177 | SS32 | 0.0 | 0.0 | 0.0 | 5.8 | 0.0 | 0.0 | 0.0 | 0.0 | 0.0 |
| | (B-5) | 4 | 96 | TS-G | 0.0 | 0.0 | 0.0 | 0.0 | 6.4 | 0.0 | 0.0 | 0.0 | 0.0 |
| | (B-6) | 1 | 202 | — | 0.0 | 0.0 | 0.0 | 0.0 | 0.0 | 0.0 | 0.0 | 0.0 | 0.0 |
| (C) COMPONENT | (C-1) | — | — | NPPOC-TMG | 0.2 | 0.2 | 0.2 | 0.2 | 0.2 | 0.2 | 0.2 | 0.06 | 0.8 |
| TOTAL MASS (PARTS) OF COMPONENT (A), COMPONENT (B), AND COMPONENT (C) | | | | | 20.0 | 20.0 | 20.0 | 20.0 | 20.0 | 19.8 | 19.8 | 20.0 | 20.0 |
| MASS (PARTS) OF EACH COMPONENT WITH RESPECT TO 100 PARTS OF TOTAL MASS OF COMPONENT (A), COMPONENT (B), AND COMPONENT (C) | | | | (A) COMPONENT | 75.0 | 78.7 | 68.5 | 69.9 | 67.1 | 83.8 | 15.2 | 41.3 | 39.8 |
| | | | | (B) COMPONENT | 24.0 | 20.3 | 30.5 | 29.1 | 31.9 | 15.2 | 83.8 | 58.4 | 56.2 |
| | | | | (C) COMPONENT | 1.0 | 1.0 | 1.0 | 1.0 | 1.0 | 1.0 | 1.0 | 0.3 | 4.0 |
| MASS RATIO OF COMPONENT (A) TO COMPONENT (B) (PERCENTAGE: %) | | | | (A) COMPONENT | 75.7 | 79.5 | 69.2 | 70.6 | 67.8 | 84.7 | 15.3 | 41.5 | 41.5 |
| | | | | (B) COMPONENT | 24.3 | 20.5 | 30.8 | 29.4 | 32.2 | 15.3 | 84.7 | 58.5 | 58.5 |
| EVALUATION OF CURABILITY OF PHOTOCURABLE COMPOSITION | | | | UNDER NON-UV IRRADIATION | Y | Y | Y | Y | Y | Y | Y | Y | N |
| | | | | UNDER UV IRRADIATION | N | N | N | N | N | N | N | N | — |
| | | | | COMPREHENSIVE DETERMINATION | N | N | N | N | N | N | N | N | N |

PHOTOCURABLE COMPOSITION

BACKGROUND

1. Technical Field

The present disclosure relates to a photocurable composition.

2. Description of the Related Art

A photocurable composition that changes from a liquid state to a solid state by irradiation with an active energy ray such as an ultra-violet light can be cured at a lower temperature as compared with a thermosetting composition that is cured by heat, and thus can be used as an energy saving material, for example, in applications of an adhesive, a coating material, and a resist material. Such a photocurable composition includes a radical polymerization-based composition having a radical species as a reactive active species, a cationic polymerization-based composition having a cation as a reactive active species, and an anionic polymerization-based composition having an anion as a reactive active species, which conventionally have been widely used. Among them, anionic polymerization-based compositions have attracted attention because shrinkage during curing is small, curing inhibition by oxygen or moisture hardly occurs, and corrosion or yellowing hardly occurs in a cured product or a peripheral member due to a reaction initiator, as compared with a radical polymerization-based composition and a cationic polymerization-based composition.

For example, an anionic polymerization-based composition containing an epoxy resin as a main component disclosed in PTL 1 is used in potting, molding, coating, an adhesive, a sealing agent, photolithography, photographic print, various resist materials, and the like. The anionic polymerization-based composition disclosed in PTL 1 can be cured at room temperature (for example, 20° C.) or at a relatively low heating temperature (for example, 90° C.).

CITATION LIST

Patent Literature

PTL 1: Japanese Patent No. 6036703

SUMMARY

A photocurable composition according to an aspect of the present disclosure includes:
a component (A): (meth)acrylic acid ester having 2 to 6 (meth)acryloyl groups in one molecule;
a component (B): a thiol compound having two or more thiol groups in one molecule; and
a component (C): a photobase generator,
in which a mass ratio of the component (A) to the component (B) is 66:34 to 33:67, inclusive,
a functional group equivalent of the component (A) is 96 g/eq to 180 g/eq, inclusive,
a functional group equivalent of the component (B) is 95 g/eq to 190 g/eq, inclusive, and
a content of the component (C) is 0.5 parts by mass to 2 parts by mass with respect to 100 parts by mass of a total of the component (A), the component (B), and the component (C).

BRIEF DESCRIPTION OF THE DRAWINGS

FIG. 1 is a table showing compositions and evaluation results of photocurable compositions of Examples 1 to 10;

FIG. 2 is a table showing compositions and evaluation results of photocurable compositions of Examples 11 to 20;

FIG. 3 is a table showing compositions and evaluation results of photocurable compositions of Examples 21 to 32;

FIG. 4 is a table showing compositions and evaluation results of photocurable compositions of Comparative Examples 1 to 10; and FIG. 5 is a table showing compositions and evaluation results of photocurable compositions of Comparative Examples 11 to 19.

DETAILED DESCRIPTIONS

When a photocurable composition is cured at room temperature, a large amount of a photobase generator or a sensitizer is required. Specifically, about 4 parts by mass of a photobase generator needs to be added with respect to 100 parts by mass of an epoxy resin in the photocurable composition, which is problematic in terms of cost. On the other hand, when the photocurable composition is cured at 90° C., there is a problem that the photocurable composition cannot be used for a member weak to heat, and the usable applications of the photocurable composition are limited.

An object of the present disclosure is to provide a photocurable composition having excellent curability, specifically, a photocurable composition that cures at around normal temperature (more specifically, a temperature lower than 30° C.).

Hereinafter, exemplary embodiments of the present disclosure will be specifically described. The present disclosure is not limited to these exemplary embodiments. The present disclosure can be appropriately modified and implemented within the scope of the object of the present disclosure.

The numerical ranges described herein are intended to include the lower and upper limit numerical values themselves. For example, the numerical range of "96 g/eq to 180 g/eq" indicates a range between 96 g/eq and 180 g/eq (inclusive), and is interpreted as including the lower limit value of "96 g/eq" and also including the upper limit value of "180 g/eq".

Hereinafter, the photocurable composition will be described in detail.

<Photocurable Composition>

A photocurable composition according to an exemplary embodiment of an aspect of the present disclosure (hereinafter, referred to as the present exemplary embodiment) includes:
a component (A): (meth)acrylic acid ester having 2 to 6 (meth)acryloyl groups in one molecule;
a component (B): a thiol compound having 2 to 4 thiol groups in one molecule; and
a component (C): a photobase generator,
in which a mass ratio of the component (A) to the component (B) is 66:34 to 33:67, inclusive,
a functional group equivalent of the component (A) is 96 g/eq to 180 g/eq, inclusive,
a functional group equivalent of the component (B) is 95 g/eq to 190 g/eq, inclusive, and
a content of the component (C) is 0.5 parts by mass to 2 parts by mass with respect to 100 parts by mass of a total of the component (A), the component (B), and the component (C).

In addition, in the photocurable composition according to the present exemplary embodiment, other components such as various additives may be blended in addition to the component (A), the component (B), and the component (C) within a range where the curability of the photocurable composition and the flexibility of a cured product thereof are not impaired. Examples of the additive include an antioxidant.

As to the photocurable composition according to the present exemplary embodiment, its curability is excellent, and a cured product can be formed at a temperature around normal temperature after irradiation with an active energy ray. The reason for this is considered as follows. When the photocurable composition is irradiated with an active energy ray, the component (C) is decomposed to generate a base. The generated base reacts with a thiol group of the component (B). By this reaction, reactive active species (thiolate anion) derived from a thiol group of the component (B) are generated. The reactive active species (thiolate anion) react with a (meth)acryloyl group of the component (A). A cured product is obtained by these reactions. In the photocurable composition according to the present exemplary embodiment, since the component (A) has a (meth)acryloyl group having high electrophilicity, a thiolate anion having high nucleophilicity which is generated as a result of reacting the component (B) with a base, generated by decomposing the component (C) by irradiation with an active energy ray, as a reaction initiator can rapidly react with the (meth)acryloyl group of the component (A) at around normal temperature to cure the photocurable composition. Therefore, the photocurable composition according to the present exemplary embodiment is excellent in curability and can be cured at around normal temperature. Note that, the curing of the photocurable composition can be confirmed by the storage elastic modulus and the loss elastic modulus of the photocurable composition. A method for measuring the storage elastic modulus and the loss elastic modulus of the photocurable composition will be described in Examples.

The active energy ray is, for example, an ultra-violet light (UV), an electron beam, an α ray, and a β ray, and is specifically an ultra-violet light.

Irradiation with an active energy ray is not particularly limited, but can be performed at a temperature between, for example, 20° C. and 30° C. (inclusive).

The curing reaction after irradiation with an active energy ray is not particularly limited, but can be performed at, for example, room temperature or higher, and specifically, between 20° C. and 80° C. (inclusive) and more specifically, 20° C. or higher and lower than 30° C.

The photocurable composition of the present disclosure has excellent curability, and can be cured at less than 30° C. after irradiation with an active energy ray.

Hereinafter, each component will be described in detail.

[Component (A): (Meth)Acrylic Acid Ester Having 2 to 6 (Meth)Acryloyl Groups in One Molecule]

The component (A) is a (meth)acrylic acid ester having 2 to 6 (meth)acryloyl groups in one molecule, and the functional group equivalent of the component (A) is 96 g/eq to 180 g/eq. The (meth)acrylic acid ester as the component (A) can react by anionic polymerization to contribute to curing of the photocurable composition. Since the component (A) has 2 to 6 acryloyl groups and has the functional group equivalent of 96 g/eq to 180 g/eq, the photocurable composition according to the present exemplary embodiment can have moderate curability.

The (meth)acrylic acid ester as the component (A) preferably has 3 to 6 (meth)acryloyl groups and more preferably 4 to 6 (meth)acryloyl groups in one molecule from the viewpoint of imparting curability to the photocurable composition. In addition, the functional group equivalent of the component (A) is preferably 96 g/eq to 150 g/eq and more preferably 96 g/eq to 100 g/eq from the viewpoint of imparting curability to the photocurable composition.

The (meth)acrylic acid ester as the component (A) contains, for example, a group having a bivalent to hexavalent free valence in a side chain. This group is bonded to an oxygen atom of an ester bond in the (meth)acrylic acid ester. Examples of such a group include an alkanepolyyl group, a group having a non-aromatic cyclic structure, and a group having an aromatic cyclic structure.

The alkanepolyyl group is a group having a bivalent to hexavalent chain structure (more specifically, a linear or branched structure) and 5 to 20 carbon atoms (more specifically, 5 to 15 carbon atoms), and examples thereof include an alkanediyl group, an alkanetriyl group, an alkanetetrayl group, an alkane pentayl group, and an alkane hexayl group. An alkanepolyyl group can further have one or more oxygen atoms in a structure or at a terminal portion of the alkanepolyyl group. Examples of such an alkanepolyyl group include an alkanepolyyl group having an ether bond (that is, an aliphatic ether group). Examples of the aliphatic ether group having a plurality of oxygen atoms include a poly(alkylene oxide) group (more specifically, a poly(ethylene oxide) group and the like).

The number of repetitions of ethylene oxide units in the poly(ethylene oxide) group is, for example, 1 to 14, and specifically 1 to 9. Specific examples of the trivalent alkanepolyyl group having 6 carbon atoms (that is, a hexanetriyl group) include $C_2H_5C(CH_2-)_3$. Examples of the hexavalent alkanepolyyl group having 10 carbon atoms and having one oxygen atom (that is, a decanehexayl group having one oxygen atom) include $O[CH_2C(CH_2-)_3]_2$.

The group having a non-aromatic cyclic structure is, for example, a group in which one or more alkylene groups are bonded to a non-aromatic cyclic structure, and examples thereof include a group in which two methylene groups are bonded to a tricyclodecane ring, a group in which 2 or 3 ethylene groups are bonded to an isocyanuric ring having a trione structure (that is, an isocyanurate ring) (isocyanuric acid diethylene group and isocyanuric acid triethylene group), and a group in which 2 to 6 hydrogen atoms are eliminated from an alkylene group of silsesquioxane. Examples of the non-aromatic cyclic structure include a monocyclic or polycyclic alicyclic hydrocarbon ring and heterocyclic ring having 3 to 10 carbon atoms, and a ring having an oxygen atom and a silicon atom as a ring member atom. Examples of the monocyclic alicyclic hydrocarbon ring include a cycloalkane ring. Examples of the polycyclic alicyclic hydrocarbon ring include a bicycloalkane ring, a tricycloalkane ring (more specifically, a tricyclodecane ring having 10 carbon atoms, or the like), and a tetracycloalkane ring. Examples of the monocyclic heterocyclic ring include an isocyanuric ring having 3 carbon atoms and having a trione structure. The ring which is monocyclic or polycyclic and has an oxygen atom and a silicon atom as a ring member atom is a ring having a main chain skeleton as a Si—O bond, and is, for example, a silsesquioxane ring having a random structure, a ladder type structure, a complete cage type structure (more specifically, $T_8$ and $T_{10}$), and an incomplete cage type structure, and derivatives thereof. The ring which is monocyclic or polycyclic and has an oxygen atom and a silicon atom as a ring member atom may further have a hydroxyl group.

The group having an aromatic cyclic structure is, for example, a group in which one or more alkylene groups are bonded to an aromatic cyclic structure, and examples thereof include a group obtained by eliminating 1 to 5 hydrogen atoms from a benzyl group and a phenoxyethyl group, and a group obtained by eliminating 2 to 6 hydrogen atoms from phenoxydiethylene glycol. The alkylene group may further have one or more oxygen atoms, and for example, may have an oxygen atom at a portion other than a terminal of the alkylene group. In this case, the alkylene group has an ether bond. The alkylene group may have an oxygen atom at its terminal. Examples of the aromatic cyclic structure include a benzene ring.

Examples of the (meth)acrylic acid ester as the component (A) include dipentaerythritol hexaacrylate, isocyanuric acid EO-modified di- and triacrylates, trimethylolpropane triacrylate, tris(2-acryloyloxyethyl)isocyanurate, tricyclodecane dimethanol dimethacrylate, and silsesquioxane derivatives. Among these (meth)acrylic acid esters, dipentaerythritol hexaacrylate and trimethylolpropane triacrylate are preferable, and dipentaerythritol hexaacrylate is more preferable, from the viewpoint of particularly excellent reactivity.

The photocurable composition according to the present exemplary embodiment contains the component (A) in a range where a mass ratio of the component (A) to the component (B) is 66:34 to 33:67. When the photocurable composition contains the component (A) in the above range, after the photocurable composition is irradiated with an active energy ray, the functional groups of the component (A) and the component (B) react with each other in the photocurable composition without excess or deficiency, and the photocurable composition can be cured better.

On the other hand, when the mass ratio of the component (A) is larger than the above range, the (meth)acryloyl group of the component (A) is excessive with respect to the functional group of the component (B). When the mass ratio of the component (A) is smaller than the above range, the (meth)acryloyl group of the component (A) is too small with respect to the functional group of the component (B). In any case, the unreacted component (A) or component (B) remains in the cured product even after irradiation with an active energy ray, and the photocurable composition may not be sufficiently cured. In such a case, aged deterioration of the cured product or oozing of the unreacted component (A) or component (B) may occur. Alternatively, when one of the component (A) and the component (B) is further excessive, the photocurable composition may not be cured.

[Component (B): Thiol Compound having 2 to 4 Thiol Groups in One Molecule]

The component (B) is a thiol compound having 2 to 4 thiol groups in one molecule, and has a functional group equivalent of 95 g/eq to 190 g/eq. The thiol compound as the component (B) is a compound that reacts with a base generated by decomposition of the component (C) by irradiation with an active energy ray to serve as an active species for anionic polymerization and react with the compound (A), and can contribute to curing of the photocurable composition.

The component (B) is not particularly limited as long as the component (B) is a thiol compound having 2 to 4 thiol groups in one molecule, and has a functional group equivalent of 95 g/eq to 190 g/eq.

The thiol compound as the component (B) has, for example, 2 to 4, and preferably 3 or 4 thiol groups in one molecule.

The thiol compound as the component (B) preferably does not contain a carboxylic acid group in the molecular structure, and more preferably has at least one structure selected from the group consisting of an isocyanurate ring structure and a glycoluril structure. When the thiol compound as the component (B) does not contain a carboxylic acid group in its molecular structure or has at least one structure selected from the group consisting of an isocyanurate ring structure and a glycoluril structure, the acidity of the thiol compound as the component (B) is not relatively high, thus an unintended side reaction hardly proceeds in the photocurable composition, and a deterioration in stability of the photocurable composition is suppressed. In addition, in such a case, in the photocurable composition, the base generated from the photobase generator as the component (C) is hardly captured by the thiol compound as the component (B) under irradiation with an active energy ray, and a decrease in the proceeding of the curing reaction is suppressed.

Examples of the thiol compound having no carboxylic acid group in the molecular structure include pentaerythritol tetrakis(3-mercaptobutyrate). Examples of the thiol compound having at least one structure selected from the group consisting of an isocyanurate ring structure and a glycoluril structure include 1,3,4,6-tetrakis(2-sulfanylethyl)tetrahydroimidazo[4,5-d]imidazole-2,5(1H,3H)-dione.

The thiol compound as the component (B) is not particularly limited, and examples thereof include pentaerythritol tetrakis(3-mercaptobutyrate), 1,4-bis(3-mercaptobutyryloxy)butane, 1,3,5-tris(2-(3-sulfanylbutanoyloxy)ethyl)-1,3,5-triazinane-2,4,6-trione, 1,3,5-tris[3-(2-mercaptoethylsulfanyl)propyl]isocyanurate, 1,3,4,6-tetrakis(2-sulfanylethyl)tetrahydroimidazo[4,5-d]imidazole-2,5(1H,3H)-dione, and 1,3,4,6-tetrakis(2-sulfanylpropyl)tetrahydroimidazo[4,5-d]imidazole-2,5(1H,3H)-dione.

Among these thiol compounds, 1,3,4,6-tetrakis(2-sulfanylpropyl)tetrahydroimidazo[4,5-d]imidazole-2,5(1H,3H)-dione is preferable from the viewpoint of particularly excellent reactivity.

The functional group equivalent of the thiol group in the component (B) is 95 g/eq to 190 g/eq, preferably 96 g/eq to 140 g/eq, and more preferably 96 g/eq to 110 g/eq.

When the number of thiol groups and the functional group equivalent of the component (B) are within the above ranges, the photocurable composition according to the present exemplary embodiment can have moderate curability.

The photocurable composition according to the present exemplary embodiment contains the component (B) in a range where a mass ratio of the component (A) to the component (B) is 66:34 to 33:67. When the photocurable composition contains the component (B) in the above range, after the photocurable composition is irradiated with an active energy ray, the functional groups of the component (A) and the component (B) react with each other in the photocurable composition without excess or deficiency, and the photocurable composition can be cured better.

On the other hand, when the mass ratio of the component (B) is larger than the above range, the functional group of the component (B) is excessive with respect to the (meth)acryloyl group of the component (A). When the mass ratio of the component (B) is smaller than the above range, the functional group of the component (B) is too small with respect to the (meth)acryloyl group of the component (A). In any case, the unreacted component (A) or component (B) remains in the cured product even after irradiation with an active energy ray, and the photocurable composition may not be sufficiently cured. In such a case, aged deterioration of the cured product or oozing of the unreacted component (A) or component (B) may occur. Alternatively, when one of the component (A) and the component (B) is further excessive, the photocurable composition may not be cured.

[Component (C): Photobase Generator]

The photobase generator as the component (C) is a compound which is decomposed by irradiation with an active energy ray to generate a base. The base generated from the component (C) abstracts hydrogen from the thiol group contained in the component (B) to produce a thiolate anion. The produced thiolate anion reacts with the (meth) acryloyl group contained in the compound of the component (A).

The component (C) has a base (anion) made latent to an active energy ray (for example, light, specifically, ultraviolet light). That is, the component (C) is a compound that generates a base by irradiation with an active energy ray, and is a compound that hardly generates a base under non-irradiation with an active energy ray. Since the photocurable composition according to the present exemplary embodiment contains the component (C), the polymerization reaction does not proceed during storage under non-irradiation with an active energy ray, and an increase in viscosity of the photocurable composition hardly occurs.

The component (C) can preferably contain at least one selected from the group consisting of a nonionic carbamate compound, an amide compound, and a primary, secondary and tertiary alkyl amine compound.

The nonionic carbamate compound is not particularly limited, and examples thereof include 9-anthrylmethyl N,N-diethylcarbamate, (2-nitrophenyl)methyl 4-(methacryloyloxy)piperidine-1-carboxylate, (2-nitrophenyl)methyl 4-hydroxypiperidine-1-carboxylate, and 2-(2-nitrophenyl)propyloxycarbonyl-1,1,3,3-tetramethylguanidine.

The nonionic amide compound is not particularly limited, and examples thereof include (E)-1-piperidino-3-(2-hydroxyphenyl)-2-propene-1-one and (E)-N-cyclohexyl-3-(2-hydroxyphenyl)acrylamide.

The nonionic primary, secondary, and tertiary amine compounds are not particularly limited, and examples thereof include 2-((hexahydropyrrolo[1,2-a]pyrimidine-1 (2H)-yl)methyl)-9H-thioxanthene-9-one.

The component (C) is preferably a compound capable of generating a strong base such as an amidine, guanidine, or phosphazene base. In the photocurable composition according to the present exemplary embodiment, hydrogen is abstracted from the thiol compound of the component (B) by the base generated by the decomposition of the component (C) to react with the (meth)acryloyl group of the (meth) acrylic acid ester of the component (A). Therefore, when the component (C) is a compound that generates a strong base, the above reaction can proceed particularly quickly by the generated strong base. As a result, the photocurable composition can be cured particularly better.

The component (C) is preferably a nonionic carbamate compound and more preferably 2-(2-nitrophenyl)propyloxycarbonyl-1,1,3,3-tetramethylguanidine from the viewpoint of being capable of generating a strong base by irradiation with an active energy ray.

The photocurable composition according to the present exemplary embodiment contains the component (C) in a range of 0.5 parts by mass to 2 parts by mass with respect to 100 parts by mass of the total mass of the component (A), the component (B), and the component (C).

When the component (C) is contained with a content within the above range, the curing reaction of the photocurable composition can proceed better. When the content of the component (C) is too low (for example, when the content of the component (C) is less than 0.5 parts by mass), the amount of the base generated by light irradiation can be reduced, and the photocurable composition cannot be sufficiently cured.

If the content of the component (C) is too high (for example, when the content of the component (C) exceeds 2 parts by mass,), a large amount of free base may be present in the photocurable composition. In such a case, there is a possibility that the storage stability of the photocurable composition is impaired. In addition, when the component (C) is solid, specifically powdery, it may not be dissolved in components other than the component (C).

In addition, in the photocurable composition according to the present exemplary embodiment, any component such as various resins and additives may be blended in addition to the component (A), the component (B), and the component (C) in a range without impairing the curability of the photocurable composition.

[Method for Manufacturing Photocurable Composition]

The photocurable composition according to the present exemplary embodiment can be prepared by weighing the component (A), the component (B), and the component (C) so as to be within the above-described mass ratio range, further adding other components as necessary, and sufficiently mixing each of the components. The mixing method is not particularly limited, but for example, a mixing device and the like known to those skilled in the art can be used.

In the photocurable composition according to the present exemplary embodiment, the photocurable composition can be cured at normal temperature by blending the component (A), the component (B), and the component (C) so as to be within the above-described mass ratio range. Therefore, the photocurable composition according to the present exemplary embodiment can be usefully used as a photocurable adhesive having the curability at normal temperature.

The photocurable composition according to the present exemplary embodiment can be used, for example, for adhering resin material members to each other, such as to cause deterioration or deformation of an object to be adhered due to heating.

EXAMPLES

Hereinafter, the present disclosure will be described more specifically with reference to Examples. Note that the present disclosure is not limited to the following Examples at all. In addition, unless otherwise specified, parts and % in the Examples are on a mass basis.

FIG. 1 shows conditions such as blending amounts of the component (A) to the component (C) in each of Examples and Comparative Examples.

Example 1

Hereinafter, Example 1 will be described in detail.
(Preparation of Components (A) to (C))

Dipentaerythritol hexaacrylate ("DPE-6A" manufactured by KYOEISHA CHEMICAL Co., LTD.) having six acryloyl groups in one molecule was prepared as the component (A). Pentaerythritol tetrakis(3-mercaptobutyrate) ("PE-1" manufactured by SHOWA DENKO K.K.) having four thiol groups in one molecule was prepared as the component (B). 2-(2-nitrophenyl)propyloxycarbonyl-1,1,3,3-tetramethylguanidine that is a nonionic carbamate compound was prepared as the component (C).

(Preparation of Photocurable Composition)

First, 8.2 parts by mass of the component (A) and 0.2 parts by mass of the component (C) were mixed so as to form a uniform solution using a revolution-rotation defoaming stirrer so that a total of blending amount of the component (A) to the component (C) was 20 parts by mass. To the mixture, 11.6 parts by mass of the component (B) was further added. The mixture was sufficiently mixed and dissolved using a revolution-rotation defoaming stirrer to prepare a photocurable composition of Example 1. FIG. 1 shows the composition of the photocurable composition of Example 1.

FIG. 1 is a table showing compositions of photocurable compositions of Examples 1 to 10. More specifically, the type of the components (A) to (C) of the photocurable composition, the blending amount (unit: part (parts by mass)) of each component, and the like are shown. FIGS. 2 to 5 shows compositions of Examples 11 to 32 and Comparative Examples 1 to 19 described later. Note that, notations (A-1) to (A-8), (B-1) to (B-6) and (C-1) in Tables in FIGS. 1 to 5 represent the following compounds, respectively.

[Component (A): (Meth)Acrylic Acid Ester]
- (A-1): Dipentaerythritol hexaacrylate
- (A-2): Isocyanuric acid EO-modified di- and triacrylates
- (A-3): Trimethylolpropane triacrylate
- (A-4): Tris(2-acryloyloxyethyl)isocyanurate
- (A-5): Tricyclodecane dimethanol dimethacrylate
- (A-6): Silsesquioxane derivative
- (A-7): Dodecyl methacrylate
- (A-8): Modified epoxy acrylate

[Component (B): Thiol Compound]
- (B-1): Pentaerythritol tetrakis(3-mercaptobutyrate), 1,4-bis(3-mercaptobutyryloxy)butane
- (B-2): 1,3,4,6-tetrakis(2-sulfanylpropyl)tetrahydroimidazo[4,5-d]imidazole-2,5(1H,3H)-dione
- (B-3): 1,3,5-tris(2-(3-sulfanylbutanoyloxy)ethyl)-1,3,5-triazinane-2,4,6-trione
- (B-4): 1,3,5-tris[3-(2-mercaptoethylsulfanyl)propyl]isocyanurate
- (B-5): 1,3,4,6-tetrakis(2-sulfanylethyl)tetrahydroimidazo[4,5-d]imidazole-2,5(1H,3H)-dione
- (B-6): Dodecanethiol

[Component (C): Photobase Generator]
- (C-1): 2-(2-nitrophenyl)propyloxycarbonyl-1,1,3,3-tetramethylguanidine (Evaluation Method)
(Curability of Photocurable Composition)

The curability of the photocurable composition was evaluated by the degree of curing in a coating film 1 hour after ultra-violet light (UV) irradiation. First, the photocurable composition was applied onto a transparent stage of a UV irradiation type rheometer ("DHR-2" manufactured by TA Instruments.) to form a coating film.

Next, the storage elastic modulus and the loss elastic modulus of the coating film were measured. The coating film was irradiated with an ultra-violet light using a high-pressure mercury lamp with a gap of 100 μm and a bandpass filter as a light source. As the UV irradiation conditions, the UV irradiation amount at 365 nm was 1000 mJ/cm$^2$, the illuminance was 60 mW/cm$^2$, and the irradiation time was 17 seconds. After UV irradiation, the coating film was kept at 25° C. In addition, the storage elastic modulus and the loss elastic modulus of the coating film were measured using a UV irradiation type rheometer. An intersection point between the storage elastic modulus and the loss elastic modulus in which a time from the UV irradiation start time to a time until which the storage elastic modulus and the loss elastic modulus intersect was determined, was defined as a timing of gelation, and a time to the intersection point (the time determined above) was defined as a curing time.

The effect state of the coating film 2 hours after UV irradiation was visually observed, and the degree of curing (cured or uncured) was determined based on the following criteria from the monitoring result and the curing time.

(Criteria for Determination in Curability)

Cured: The curing time is less than 1 hour, and the coating film 1 hour after UV irradiation is in a state of no fluidity (That is, it means a state in which the storage elastic modulus is higher than the loss elastic modulus.).

Uncured: The curing time is 1 hour or more, and the coating film 1 hour after UV irradiation is in a state of having fluidity.

From the obtained determination results, the curability of the photocurable composition was evaluated based on the following criteria.

(Evaluation Criteria for Curability)

Y (good): The determination result indicates cured under UV irradiation.

N (poor): The determination result indicates uncured under UV irradiation.

The obtained evaluation results were designated as "Evaluation results of curability of photocurable composition under UV irradiation". The evaluation results are shown in FIG. 1.

In addition, in order to compare the curability depending on the presence or absence of UV irradiation, "Curability of photocurable composition under non-UV irradiation" was also evaluated. This evaluation was performed in the same procedure as described above except that UV irradiation was not performed and the evaluation criteria were different.

From the obtained determination results, the curability of the photocurable composition was evaluated based on the following criteria.

(Evaluation Criteria for Curability)

Y (good): The determination result indicates uncured under non-UV irradiation.

N (poor): The determination result indicates cured under non-UV irradiation.

The obtained evaluation results were designated as "Evaluation results of curability of photocurable composition under non-UV irradiation". The evaluation results are shown in FIG. 1.

(Comprehensive Determination)

The curability of the photocurable composition was comprehensively evaluated based on the following evaluation criteria from the evaluation results of the curability of the photocurable composition under UV irradiation or non-UV irradiation. The results of the comprehensive determination are shown in FIG. 1.

(Evaluation Criteria for Comprehensive Determination)

Y (good): The evaluation result of the curability of the photocurable composition under UV irradiation is "cured", and the evaluation result of the curability of the photocurable composition under non-UV irradiation is "uncured".

N (poor): The evaluation result of the curability of the photocurable composition under UV irradiation is "uncured", or the evaluation result of the curability of the photocurable composition under non-UV irradiation is "cured".

Examples 2 to 30 and Comparative Examples 1 to 19

A respective photocurable composition was prepared in the same manner as in Example 1 except that the composition was changed to the compositions shown in FIGS. 1 to 5. In addition, the curability of the photocurable composition was evaluated in the same manner as in Example 1. The evaluation results are shown in FIGS. 1 to 5. In Comparative Example 19, the evaluation result under non-UV irradiation was "N (poor)". That is, the coating film of the photocurable composition was cured under non-UV irradiation. Therefore, the curability under UV irradiation could not be appropriately evaluated.

As shown in FIGS. 1 to 3, the photocurable compositions of Examples 1 to 32 contained the component (A) to the component (C), the mass ratio of the component (A) to the component (B) was in the range of 66:34 to 33:67, and the content of the component (C) was 0.5 parts by mass to 2 parts by mass with respect to 100 parts by mass of a total of the component (A), the component (B), and the component (C). That is, the photocurable compositions of Examples 1 to 32 were incorporated in the photocurable composition of the present exemplary embodiment described above.

As shown in FIGS. 1 to 3, as to the photocurable compositions of Examples 1 to 32, the evaluation results of the comprehensive determination of the curability were all Y (good).

As shown in FIGS. 4 and 5, the photocurable compositions of Comparative Examples 1 to 19 were outside the range of the photocurable composition of the present exemplary embodiment described above, and the evaluation results of the curability were all N (poor). The photocurable compositions of Comparative Examples 1 to 18 were not crosslinked in less than 1 hour after UV irradiation and became uncured.

More specifically, in the photocurable compositions of Comparative Examples 1 to 5, the number of (meth)acryloyl groups in one molecule of dodecyl methacrylate as the component (A) was 1 that was outside the range of 2 to 6, and the functional group equivalent of dodecyl methacrylate was 254 g/eq that was outside the range of 96 g/eq to 180 g/eq. These photocurable compositions were not crosslinked in less than 1 hour after UV irradiation and became uncured.

In the photocurable compositions of Comparative Examples 6 to 10, the number of thiol groups in one molecule of dodecanethiol as the component (B) was 1 that was outside the range of 2 to 4, and the functional group equivalent of dodecanethiol was 202 g/eq that was outside the range of 95 g/eq to 190 g/eq. The photocurable compositions were not crosslink after UV irradiation and became uncured.

In the photocurable compositions of Comparative Examples 11 to 15, the functional group equivalent of the modified epoxy acrylate as the component (A) was 425 g/eq that was outside the range of 96 g/eq to 180 g/eq. In the photocurable compositions of Comparative Examples 11 to 15, it is considered that since the functional group density of the component (A) was low, the curing reaction hardly proceeded, and the photocurable composition was not sufficiently cured in less than 1 hour after UV irradiation.

In the photocurable compositions of Comparative Examples 16 and 17, the mass ratios of the component (A) to the component (B) were 84.7:15.3 and 15.3:84.7, respectively, and both of the mass ratios were outside the range of 66:34 to 33:67. In the photocurable composition of Comparative Example 16, the component (A) was excessive with respect to the component (B), and in the photocurable composition of Comparative Example 17, the component (B) was excessive with respect to the component (A). It is considered to be because, in these photocurable compositions, since either the component (A) or the component (B) was excessive, the curing reaction proceeded after UV irradiation, but the unreacted component (A) or component (B) remained and became apparently uncured.

In the photocurable compositions of Comparative Examples 18 and 19, the content of the component (C) was 0.3 parts by mass and 4.0 parts by mass, respectively, with respect to 100 parts by mass of a total of the component (A), the component (B), and the component (C), and both were outside the range of 0.5 parts by mass to 2 parts by mass. It is considered to be because, in the photocurable composition of Comparative Example 18, the content of the component (C) was small, and the curing reaction did not sufficiently proceed. In addition, it is considered to be because, in the photocurable composition of Comparative Example 19, since the content of the component (C) was large and the amount of free bases existing under non-UV irradiation was relatively large, the curing reaction proceeded to some extent even under non-UV irradiation.

From the above, it is apparent that the photocurable compositions of Examples 1 to 32 are superior in curability to the photocurable compositions of Comparative Examples 1 to 19.

Since the photocurable composition of the present disclosure is cured at lower than 30° C. by irradiation with an active energy ray, the photocurable composition can be used as an adhesive between base materials having low heat resistance such as a resin base material.

What is claimed is:

1. A photocurable composition comprising:
    a component (A): (meth)acrylic acid ester having 2 to 6 (meth)acryloyl groups in one molecule;
    a component (B): a thiol compound having 2 to 4 thiol groups in one molecule; and
    a component (C): a photobase generator,
    wherein a mass ratio of the component (A) to the component (B) is 66:34 to 33:67, inclusive,
    a functional group equivalent of the component (A) is 96 g/eq to 180 g/eq, inclusive,
    a functional group equivalent of the component (B) is 95 g/eq to 190 g/eq, inclusive, and
    a content of the component (C) is 0.5 parts by mass to 2 parts by mass with respect to 100 parts by mass of a total of the component (A), the component (B), and the component (C).

2. The photocurable composition according to claim 1, wherein the thiol compound as the component (B) has at least one structure selected from the group consisting of an isocyanurate ring structure and a glycoluril structure.

3. The photocurable composition according to claim 1, wherein the component (C) contains at least one selected from the group consisting of a nonionic carbamate compound, an amide compound, and a primary, secondary, and tertiary alkylamine compound.

4. A photocurable composition consisting of a component (A), a component (B) and a component (C):
    the component (A): (meth)acrylic acid ester having 2 to 6 (meth)acryloyl groups in one molecule;
    the component (B): a thiol compound having 2 to 4 thiol groups in one molecule; and
    the component (C): a photobase generator,
    wherein a mass ratio of the component (A) to the component (B) is 66:34 to 33:67, inclusive,
    a functional group equivalent of the component (A) is 96 g/eq to 180 g/eq, inclusive,
    a functional group equivalent of the component (B) is 95 g/eq to 190 g/eq, inclusive, and
    a content of the component (C) is 0.5 parts by mass to 2 parts by mass with respect to 100 parts by mass of a total of the component (A), the component (B), and the component (C).

5. A photocurable composition comprising:
a component (A): (meth)acrylic acid ester having 2 to 6 (meth)acryloyl groups in one molecule;
a component (B): a thiol compound having 2 to 4 thiol groups in one molecule; and
a component (C): a photobase generator,
wherein a mass ratio of the component (A) to the component (B) is 66:34 to 33:67, inclusive,
a functional group equivalent of the component (A) is 96 g/eq to 180 g/eq, inclusive,
a functional group equivalent of the component (B) is 95 g/eq to 110 g/eq, inclusive, and
a content of the component (C) is 0.5 parts by mass to 2 parts by mass with respect to 100 parts by mass of a total of the component (A), the component (B), and the component (C).

* * * * *